FEEDBACK INTENSITY CONTROL FOR CONTINUOUS FILM SCANNER

Filed Oct. 12, 1951 2 Sheets-Sheet 1

INVENTORS R. E. GRAHAM
C. F. MATTKE
BY
Arthur J. Torsiglieri
ATTORNEY

Dec. 24, 1957 R. E. GRAHAM ET AL 2,817,702

FEEDBACK INTENSITY CONTROL FOR CONTINUOUS FILM SCANNER

Filed Oct. 12, 1951 2 Sheets-Sheet 2

INVENTORS: R. E. GRAHAM
C. F. MATTKE

BY Arthur J. Torsiglieri

ATTORNEY 2,817,702
Patented Dec. 24, 1957

2,817,702

FEEDBACK INTENSITY CONTROL FOR CONTINUOUS FILM SCANNER

Robert E. Graham, Chatham, and Charles F. Mattke, Fanwood, N. J., assignors to Bell Telephone Laboratories, Incorporated, New York, N. Y., a corporation of New York Application October 12, 1951, Serial No. 251,112

6 Claims. (Cl. 178—7.2)

This invention relates to a continuous projector for motion pictures and more particularly to a light intensity regulating system for such a projector when used as a film scanner for television purposes.

In a pending application of C. F. Mattke, Serial No. 124,403, filed October 29, 1949, now U. S. Patent No. 2,718,549, issued September 20, 1955, there is disclosed a special film projector by means of which the frames of a continuously moving motion picture film are projected as stationary images on a viewing screen, and the illusion of scene motion is produced as images of successive frames are merged on the viewing screen. This projector compensates for the steady movement of the film by employing a rotating crown of mirrors in the optical path. When viewed through the crown of mirrors, the film movement appears to be stopped so that successive frames blend into and out of view without flicker.

This projector, in an important example of practice, may also be used as a scanner of continuously moving motion picture film for television purposes. Ordinarily, the television scanning of motion pictures presents considerable difficulty in that the movie standard is 24 frames per second as compared with the television standard of 30 frames or 60 fields per second. This special projector, however, by virtue of its non-intermittent operation, avoids the consequences of this dissimilarity and can use standard 24 frame motion picture film. In an illustrative embodiment of this example of practice, the viewing screen is replaced by the luminescent screen of a cathode ray tube, the cathode beam of which is caused to scan the luminescent screen in the desired scanning pattern. In operating this scanner, a moving light beam is formed which is projected through the frames of a continuously moving motion picture film, thereby scanning the frames of the film. The transmitted beam is modulated in accordance with the picture information of the moving film and then is directed to a photosensitive device wherein corresponding television image currents are produced.

For the sake of illustration, the invention will be described for incorporation in a continuous film scanner of this type, although it will be evident that the invention can find application in other forms of continuous film scanners.

Continuous film scanners, comprising, as they usually do, rotating reflecting surfaces in the optical path, are normally characterized by cylindrical variations in the photometric transmission efficiency of the optical path between the luminescent screen and the moving film. Effectively, this results in a variation of the light available at the moving film. For high fidelity of reproduction, however, it is important that the intensity of the light available at the moving film remain substantially constant if spurious modulation of the video signal is to be avoided or, more specifically, that the video signal output for clear film in the film gate remains substantially constant over the scanning cycle.

In a pending application, Serial No. 216,234, filed March 17, 1951, by R. E. Graham and C. F. Mattke, now Patent Number 2,779,819, issued January 29, 1957, there is disclosed a light regulating servo system for this general purpose. An auxiliary optical path is provided between the moving film and the light source whose photometric efficiency is made to undergo substantially the same fluctuations which characterize the primary optical path between these same points. The light transmitted through this auxiliary path is then utilized to control a servo system which adjusts the intensity of the cathode ray source to compensate for the variations in efficiency of the optical path or any other undesirable fluctuations, such as variations resulting from non-uniformities in luminescence of the screen of the cathode ray tube, and to maintain thereby the light intensity at the film substantially constant. In this light servo system, separate photocells are used for the television signal of the primary path and for the intensity control signal of the auxiliary path for monitoring continuously over the entire scanning cycle. This arrangement requires that any non-uniformities in the photosensitivities over the cathode areas used must be closely identical in the two photocells since the illuminated areas on the photocathodes are not the same throughout the cycle. Any appreciable variation in the two cathode sensitivities results in a false measure of the light efficiency. In practice, it is sometimes found inconvenient to secure two photocells sufficiently alike. Accordingly, for general application it is desirable to utilize a light regulating system which avoids this problem.

An analytical study involving ray tracing through a cycle of operation indicates that variations in optical efficiency of the primary path are most significant for changes in the vertical position of the scanning beam, the optical efficiency remaining quite constant over the period of a single horizontal line trace of the scanning beam.

In accordance with the present invention, this characteristic is utilized in a light servo-system in which the scanning beam is made to overscan on each horizontal line trace with respect to the film gate past which the film moves; the overscan is passed through a clear gate adjacent to the film gate by way of an auxiliary optical path to the same photocell in which the film signal output is developed; and thereafter the overscan output is separated from the film signal output and utilized for the control of the intensity of the cathode ray source.

The invention will be better understood from the following more detailed description in which.

Figures 1, 2:
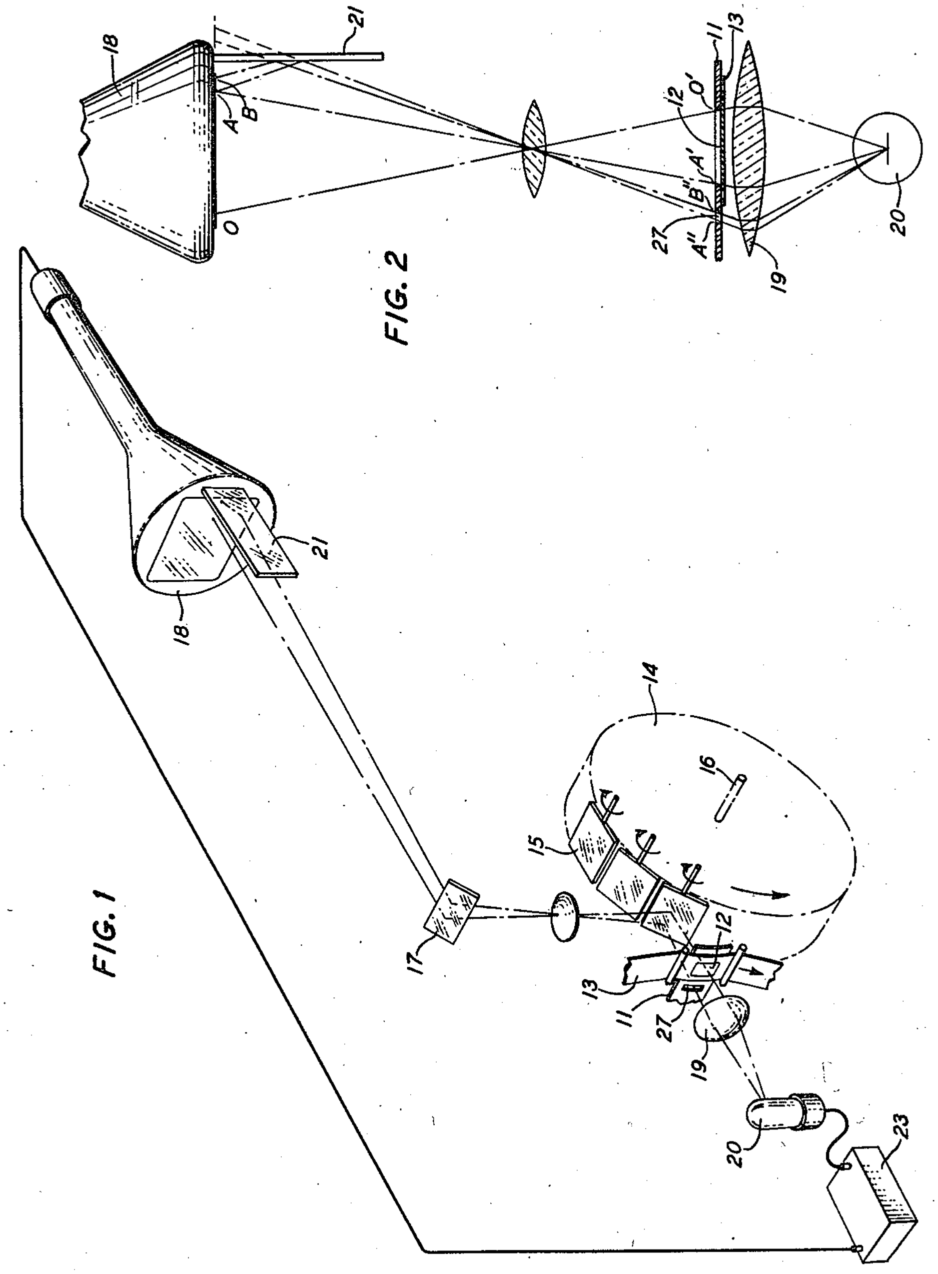
Fig. 1 is a perspective view of an illustrative light regulating system in accordance with the invention.
Fig. 2 is a plan view of the principal elements of this light regulating system.

In Fig. 1, there is shown schematically by way of example one form of continuous film scanner to which the invention is particularly applicable. In this film scanner, the basic components are: a curved film support 11 apertured to form the film gate 12 past which moves the motion picture film 13 to be scanned; a rotating mirror drum 14 which contains a crown of mirrors 15 whose axes are mounted parallel with the drum axle 16; an error correcting mirror 17 of the kind more particularly described in the pending application, Serial No. 167,872, filed June 13, 1950, of R. E. Graham and C. F. Mattke, now Patent Number 2,666,356, issued January 19, 1954; and the spot scanning cathode ray tube 18 which, for example, can be a flying spot scanner. In operation, the motion picture film 13 is moved down at a constant rate (the rate at which it was taken—24 frames per second, for example) past the film gate 12 in the film support 11, where it is scanned by a moving light beam from the cathode ray tube 18. For the scanning process, the light beam is supplied from the cathode ray tube 18 by way of reflections from the error correcting mirror 17 and the rotating crown 15 for traversal of the moving film through the film gate. The picture-modulated light beam is thereafter focussed by the condensing lens 19 into the photosensitive device 20 which, for example, can be a photomultiplier pick-up tube positioned in collecting relationship for the light transmitted through the film gate for transformation into television image currents. Additionally, for the practice of the present invention there is provided a clear gate or monitoring slit 27 in the film support 11, adjacent the film gate 12, which remains unobstructed by the moving film. Preferably, also, a fixed plane mirror 21 is positioned normal to the face of the cathode ray tube 18 to provide an auxiliary optical path from the tube face through the clear gate to the photosensitive device for the end portion of each horizontal trace.

Fig. 2 is a plan view of this system in which the drum mirrors and the error correcting mirror have been omitted for the sake of simplicity.

In operation, as the scanning spot travels horizontally across the tube face from O to A under the influence of the vertical and horizontal sweep deflection means, which, for example, are supplied with R. M. A. scanning signals of the kind generally in use with camera tubes of present day commercial television, the image of the spot travels across the film through the film gate from O′ to A′, the light through the film thus producing the usual television line signal at the output of the photosensitive device. As the scanning spot passes beyond A on the tube face, the image thereof is cut off by the edge of the film gate 12 in the film support. The spot on the tube, however, is allowed to travel a little further until it is blanked off electrically at B. This part of the travel, from A to B on the tube face, is reflected through the system over the auxiliary optical path by way of the plane mirror 21 in such a manner that the corresponding image travels across the clear gate from A″ to B″. This light through the clear gate 27 also passes to the photosensitive device 20 and produces a short monitoring pulse immediately following the line signal, the amplitude of this monitoring pulse being substantially a measure of the light intensity at the film gate. The condensing lens 19 acts to focus both light from the clear gate and light from the film gate to substantially the same portion of the cathode area of the photosensitive device 20, thereby minimizing errors resulting from non-uniformities in photosensitivities over the cathode area.

As a result of the arrangement described, there becomes available from the photosensitive device 20, for each horizontal line trace of the scanning spot, a combined output which includes the television line signal derived from the scan of the film and a monitoring pulse, derived from the scan through the clear gate, which, in accordance with the invention, is utilized to control the intensity of the cathode ray tube by means of suitable electrical circuit arrangements 23. To this end, it is first necessary to separate these two components of the photosensitive device output.

Figure 3:
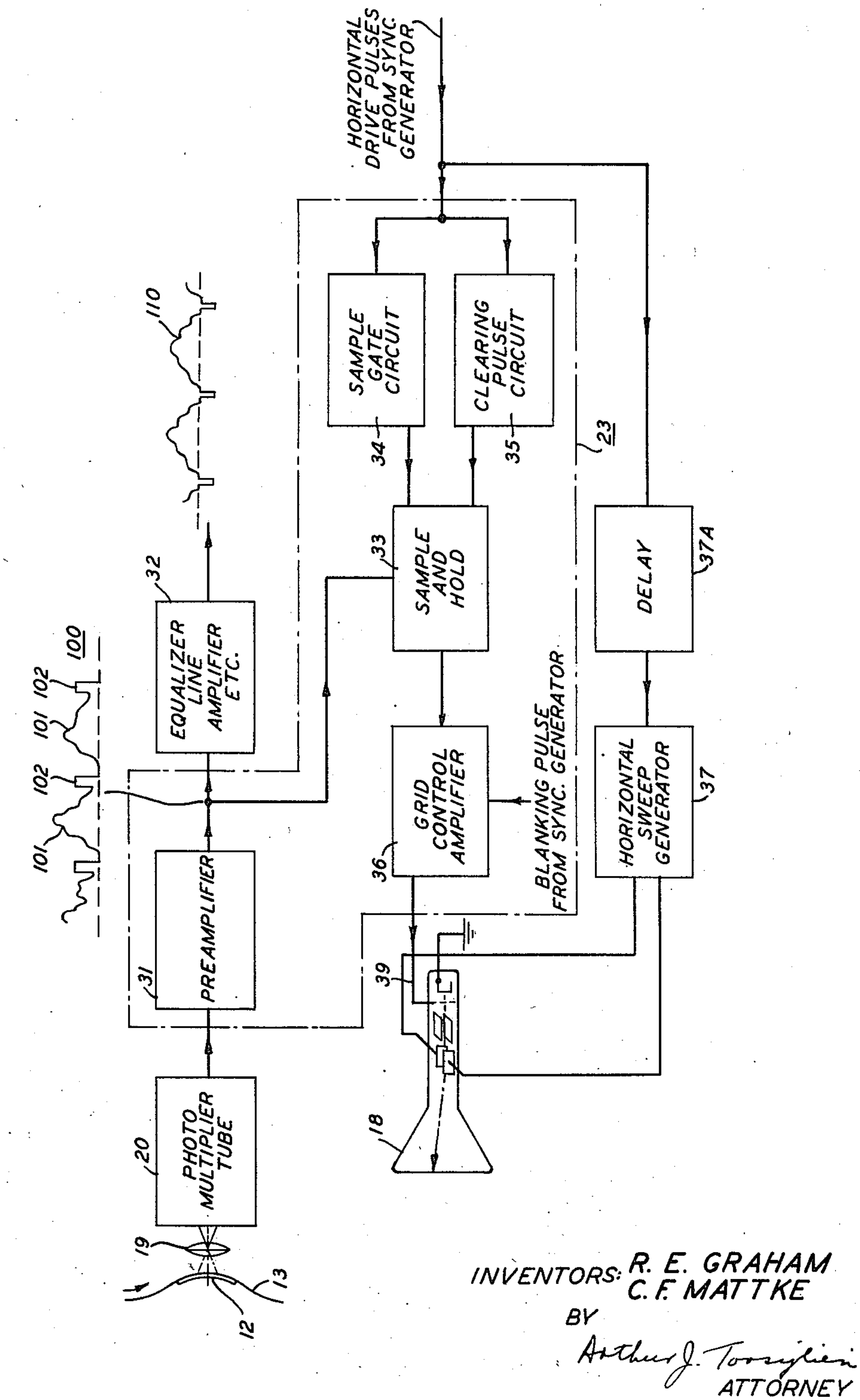
Fig. 3 is a block schematic of the electrical circuitry of this light regulating system.

Fig. 3 shows, by way of example, a typical electrical arrangement for processing the combined output, the portion shown within dash-dot lines corresponding to that represented by the box 23 in Fig. 1. After amplification in the preamplifier 31, the combined output appears as shown by the wave form 100, consisting of a normal line video signal 101, followed by a short pulse 102 of amplitude which is a measure of the optical efficiency of the corresponding transmission path. This combined output is supplied to equalizing and line amplifiers, shown as the block 32, where the light monitoring pulse is blanked out and replaced, for example, by standard R. M. A. synchronizing signals. The output of the line amplifier then has the wave form shown as 110 and consists of a standard R. M. A. video signal, suitable for transmission. For the sake of simplicity, these circuits are not shown in detail since they do not form part of the present invention and, moreover, since similar arrangements are employed in the processing of present day commercial television signals after pick-up from the camera tube before transmission.

Additionally, the amplified combined output 100 is applied to a "sample and hold" circuit 33, which acts to sample the amplitude of the light monitoring pulse 102 under control of the sample gate circuit 34 and to hold this sample until cleared by the clearing pulse circuit 35, preliminary to taking the next sample one line later. After smoothing in amplifier 36, the held output consists of a quasi D.-C. voltage which is applied to the intensity control grid 39 of the cathode ray tube 18 and which remains constant in amplitude as long as the illumination at the clear gate remains unchanged. If this illumination changes, the amplitude of the monitoring pulse varies accordingly, thereby readjusting the holding voltage, which acts in turn to modify the spot intensity in the proper sense to restore this illumination to a predetermined level. For the sake of simplicity, this circuitry has been shown only schematically since suitable circuitry can easily be devised by a worker in the art. For example in a simple typical arrangement, the sampling circuit can comprise a vacuum tube amplifier which is normally biased past cutoff and which is made to conduct periodically, under control of pulses supplied from a synchronizing source, to charge a storage capacitor to a value determined by the amplitude of the signal then being applied to its control grid. Holding action is then obtained by including in the discharge path of the storage capacitor another vacuum tube which is normally biased past cutoff and so does not permit ready discharge of the storage capacitor. Clearing is then obtained by supplying a clearing pulse to vary the bias of the last-mentioned tube for permitting conduction therethrough and consequently permitting a discharge of the storage capacitor. Various arrangements of this kind are well known, particularly in the pulse code modulation art, some of which are described in an article by L. A. Meacham and E. Peterson in the Bell System Technical Journal, January 1948, entitled "An experimental multichannel pulse code modulation system of toll quality."

Since the light monitoring pulse appears partly during the time when cathode ray tube blanking and retrace ordinarily occur, in operation it is necessary to delay the onset of blanking and also the arrival of the horizontal drive pulse to the regular horizontal sweep generator 37 of the spot scanner long enough to permit generation of the light monitoring pulse. The horizontal drive pulse which is supplied from the synchronizing generator at the studio is delayed, as by a suitable delay member 37A, to permit the spot scanner to sweep into a portion of the optical system where its transmitted brightness can be measured in the clear gate.

To insure the proper sequence and timing of the various steps, the clearing pulse circuit can, for example, be triggered by the leading edge of the undelayed horizontal drive pulse. Then, still before initiation of a new horizontal sweep of the spot scanner, the sampling circuit can be triggered by a delayed version of the horizontal drive pulse which is applied by way of the sample gate circuit which adds the necessary delay. Then, after completion of these two steps, the delayed horizontal drive pulse can initiate a new horizontal trace. In a specific embodiment of the invention which has been constructed, approximately three microseconds are allowed for the first two functions to be performed. The clearing of earlier brightness information from the sample and hold circuit is performed in the first microsecond after the beginning of the horizontal drive pulse and, then, during the next two microsecond intervals a sample of the brightness information is obtained by the sample and hold circuit under control of the sample gate circuit.

In operation, it is usually desirable to inhibit the sampling operation during the vertical retrace time between successive fields. For this purpose an inhibiting pulse can be derived under control of the vertical blanking pulse during the vertical retrace time.

It should be obvious that various other circuit configurations are possible within the skill of a worker in the art for the isolation of the light monitoring pulse from the combined output of the photocell, so that the invention is not to be limited to any particular separating arrangement.

Moreover it is to be understood that the above-described film scanner is merely illustrative of the principles of the present invention. Numerous other arrangements can be devised by one skilled in the art without departing from the spirit and scope of the present invention.

What is claimed is:

1. In a film scanner, picture film to be scanned, a cathode ray source for providing a scanning light beam, a photosensitive device, means forming a first optical path between the cathode ray source and the photosensitive device through the film, means forming a second optical path between the cathode ray source and the photosensitive device bypassing the film, means for separating from the output of the photosensitive device that portion resulting from the light bypassing the film in the second optical path, and means for utilizing said portion for regulating the intensity of the cathode ray source.

2. In a light regulating system for a film scanner, a film support having a film gate past which the film moves, a cathode ray device for providing a scanning light beam, means forming between the cathode ray source and film gate a primary optical path whose transmission efficiency varies, a photosensitive device for collecting the light transmitted through the film gate, means forming between the cathode ray source and photosensitive device an auxiliary optical path whose transmission efficiency varies substantially in the same way as that of the primary optical path, means for separating from the output of the photosensitive device that portion resulting from the secondary optical path, and means for utilizing said portion for controlling the intensity of the cathode ray source.

3. In a light regulating system for a film scanner, a cathode ray source for providing a scanning light beam, a film support having a film gate through which the film moves and a clear gate adjacent thereto, a photosensitive device, means forming first and second optical paths through the film gate and clear gate, respectively between the cathode ray source and the photosensitive device, means for separating out from the output of the photosensitive device that portion provided by the second optical path, and means for utilizing said portion for controlling the intensity of the cathode ray source.

4. In a light regulating system for a film scanner, a film support having a film gate past which the film moves, a cathode ray device for forming a scanning light beam, a photosensitive device, means forming a first optical path passing through the film from the cathode ray source to the photosensitive device for the scanning beam during a first portion of the scanning cycle, means forming a second optical path bypassing the film from the cathode ray source to the photosensitive device for the scanning beam during a second portion of the scanning cycle, means for separating the output of the photosensitive device into a first and second output corresponding respectively to the first and second portions of the scanning cycle, and means for utilizing the second output for controlling the intensity of the cathode ray source.

5. In a light regulating system for a film scanner, a film support having a film gate past which the film moves and a clear gate, a cathode ray device for providing a scanning beam which describes a series of line traces extending beyond an active picture region, a photosensitive device, means forming a first optical path through the film gate from the cathode ray source to the photosensitive device during the active picture region of each of said line traces, means forming a second optical path through the clear gate from the cathode ray source to the photosensitive device during the extended portion of each of said line traces, means for separating from the output of the photosensitive device a control signal corresponding to the extended portion of the line trace through the clear gate, and means for utilizing said control signal for regulating the intensity of the cathode ray source.

6. In a film scanner, a film support having a clear gate and a film gate past which the film moves, a cathode ray device for providing a scanning line beam which describes a series of line traces, means forming between the cathode ray source and the film gate a first optical path whose transmission efficiency varies for different line traces, means forming between the cathode ray source and the clear gate a second optical path whose transmission varies substantially as that of the first optical path with respect to different line traces, means for transmitting the scanning beam, in turn, through the film gate and clear gate during each line trace, means including a photosensitive device for collecting the light transmitted through the film gate and clear gate, means for separating from the output of the photosensitive device that portion corresponding to light through the clear gate, and means for utilizing said portion for regulating the intensity of the cathode ray source.

References Cited in the file of this patent

UNITED STATES PATENTS

| | | |
|---|---|---|
| 2,188,679 | Dovaston et al. | Jan. 30, 1940 |
| 2,199,608 | Barthelemy | May 7, 1940 |
| 2,204,427 | Moller | June 11, 1940 |
| 2,251,608 | Cook | Aug. 5, 1941 |
| 2,288,096 | Lubeke et al. | June 30, 1942 |
| 2,523,296 | Harris | Sept. 23, 1950 |
| 2,604,534 | Graham | July 22, 1952 |

FOREIGN PATENTS

| | | |
|---|---|---|
| 11,692 | Australia | Mar. 15, 1934 |
| 483,935 | Great Britain | Apr. 28, 1938 |
| 518,311 | Great Britain | Feb. 23, 1940 |